United States Patent
Shiraishi et al.

(10) Patent No.: US 11,886,271 B2
(45) Date of Patent: Jan. 30, 2024

(54) SEMICONDUCTOR DEVICE

(71) Applicant: RENESAS ELECTRONICS CORPORATION, Tokyo (JP)

(72) Inventors: Takayoshi Shiraishi, Tokyo (JP); Tomohiro Katayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/738,560

(22) Filed: May 6, 2022

(65) Prior Publication Data

US 2022/0404894 A1 Dec. 22, 2022

(30) Foreign Application Priority Data

Jun. 22, 2021 (JP) ................. 2021-103287

(51) Int. Cl.
*G06F 1/32* (2019.01)
*G06F 1/3287* (2019.01)
*G06F 1/04* (2006.01)
*G06F 1/3234* (2019.01)
*G06F 1/3296* (2019.01)

(52) U.S. Cl.
CPC .............. *G06F 1/3287* (2013.01); *G06F 1/04* (2013.01); *G06F 1/3243* (2013.01); *G06F 1/3296* (2013.01)

(58) Field of Classification Search
CPC ..... G06F 1/3287; G06F 1/3243; G06F 1/3296
See application file for complete search history.

(56) References Cited

U.S. PATENT DOCUMENTS

| | | | |
|---|---|---|---|
| 7,673,163 B2 | 3/2010 | Tsukimori et al. | |
| 10,037,073 B1* | 7/2018 | Catovic | ................. G06F 1/3206 |
| 2009/0144571 A1 | 6/2009 | Tatsumi | |
| 2010/0231044 A1 | 9/2010 | Tatsumi et al. | |

FOREIGN PATENT DOCUMENTS

JP 2007-122437 A 5/2007

OTHER PUBLICATIONS

Extended European Search Report issued in corresponding European Patent Application No. 22177567.9-1224, dated Nov. 17, 2022.

* cited by examiner

*Primary Examiner* — Stefan Stoynov
(74) *Attorney, Agent, or Firm* — Rimon P.C.

(57) ABSTRACT

A semiconductor device which is a processor includes a plurality of first power supply regions in each of which a functional module having a predetermined function is arranged and to which a power supply voltage is individually supplied, a setting unit configured to specify an order of supplying the power supply voltage in the plurality of first power supply regions, and a power controller configured to supply the power supply voltage to the plurality of first power supply regions in accordance with the order specified by the setting unit.

5 Claims, 9 Drawing Sheets

SEMICONDUCTOR DEVICE

CROSS-REFERENCE TO RELATED APPLICATIONS

The disclosure of Japanese Patent Application No. 2021-103287 filed on Jun. 22, 2021 including the specification, drawings and abstract is incorporated herein by reference in its entirety.

BACKGROUND

The present invention relates to a semiconductor device, for example, a semiconductor device having a low power consumption mode such as a software standby mode.

For example, Patent Document 1 describes a low power consumption technology for a semiconductor device. In Patent Document 1, a technology of dividing a core power supply region and controlling the ON/OFF of the power supply for each of the divided regions is described as the low power consumption technology.

There are Disclosed Techniques Listed Below

[Patent Document 1] Japanese Unexamined Patent Application Publication No. 2007-122437

SUMMARY

The power consumption of a semiconductor device can be reduced by dividing a core power supply region and cutting off the power supply to the divided power supply regions in the standby mode. If power supply to a plurality of power supply regions is started at the same time in order to shorten the return time when returning (transitioning) from the standby mode to the normal operation mode, for example, a large rush current (current) will flow, it is conceivable that the rush current causes a large voltage drop in the power supply wiring, which affects the operation of the semiconductor device. It is conceivable to supply power to the divided power supply regions in sequence in order to avoid a large voltage drop. However, in this case, there is a problem that the return time becomes longer in proportion to the number of divided power supply regions.

In the Patent Document 1, the shortening of the return time is not recognized and described.

An outline of the typical embodiment disclosed in this application will be briefly described as follows.

Namely, a semiconductor device according to an embodiment includes: a plurality of first power supply regions in each of which a functional module having a predetermined function is arranged and to which a power supply voltage is individually supplied, a setting unit configured to specify an order of supplying the power supply voltage in the plurality of first power supply regions, and a power controller configured to supply the power supply voltage to the plurality of first power supply regions in accordance with the order specified by the setting unit.

An order is set in a setting unit such that a power supply voltage is supplied substantially at the same time to the two first power supply regions, in which the rush current flowing when returning from a standby mode to a normal operation mode is relatively small, among a plurality of first power supply regions. In this way, the return time can be shortened while suppressing the occurrence of the large voltage drop.

The other problems and novel features will be apparent from the description of this specification and the accompanying drawings.

According to an embodiment, it is possible to provide a semiconductor device capable of shortening the return time from the standby state.

DETAILED DESCRIPTION

Figure 1:
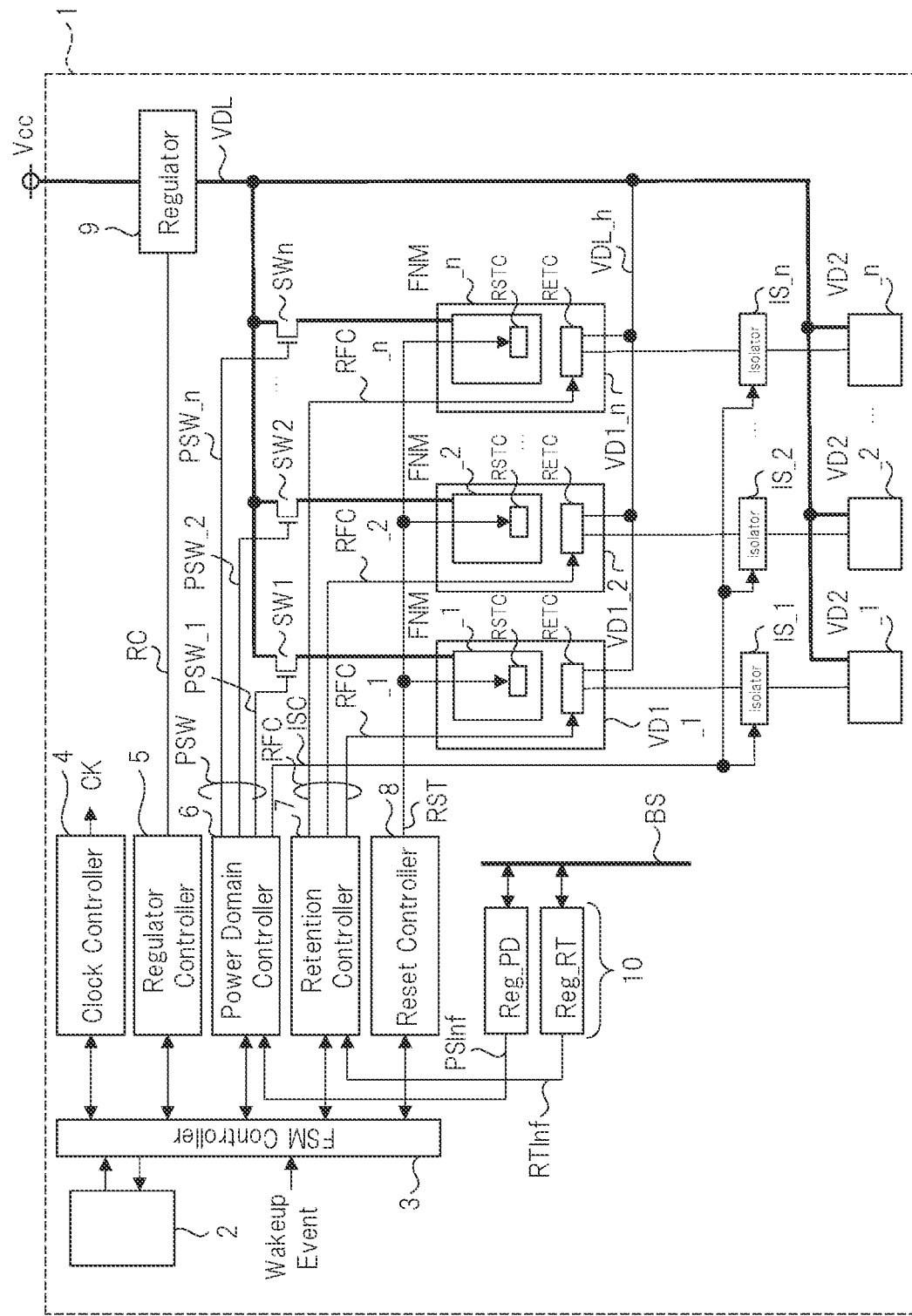
FIG. 1 is a block diagram showing a configuration of a semiconductor device according to the first embodiment.

Hereinafter, embodiments of the present invention will be described with reference to drawings. Note that the disclosure is mere an example, and the changes easily conceived by a person having ordinary skill in the art as appropriate while maintaining the gist of the invention are naturally included in the scope of the present invention.

Further, in this specification and each drawing, the same elements as those already described before with respect to the drawings already referenced may be denoted by the same reference characters, and detailed description thereof may be omitted as appropriate.

In the following description, a microprocessor (hereinafter referred to as a processor) formed on one semiconductor chip by a well-known semiconductor manufacturing technology will be described as an example of a semiconductor device, but the present invention is not limited to this. Further, the processor according to the embodiment has a software standby (hereinafter referred to as SSTBY) mode as a standby mode in order to reduce power consumption. Of course, the standby mode is not limited to the SSTBY mode.

First Embodiment

<Configuration of Semiconductor Device)

FIG. 1 is a block diagram showing a configuration of a semiconductor device (processor) according to the first embodiment. In FIG. 1, 1 denotes a processor. The processor 1 includes a plurality of functional units, but only the functional units whose descriptions are necessary are drawn in FIG. 1. The processor 1 includes a processor core 2, a low power module controller (hereinafter, FSM controller) 3, a clock controller 4, a regulator controller 5, a power controller 6, a retention controller 7, and a reset controller 8. Further, the processor 1 includes a plurality of power supply regions (domain power supply regions) VD1_1 to VD1_$n$, VD2_1 to VD2_$n$, isolators IS_1 to IS_n, a voltage regulator 9, power switches SW1 to SWn, and a setting unit 10.

Although not particularly limited, the power switches SW1 to SWn are composed of field effect transistors.

In each of the power supply regions VD1_1 to VD1_$n$ and VD2_1 to VD2_$n$, a plurality of functional modules and the like for realizing predetermined functions are arranged. In FIG. 1, one functional module arranged in each of the power supply regions VD1_1 to VD1_$n$ is denoted by the reference characters FNM_1 to FNM_n. The power switches SW1 to SWn correspond to the power supply regions VD1_1 to VD1_$n$, and the power supply regions VD1_1 to VD1_$n$ are connected to the power supply wiring VDL via the corresponding power switches SW1 to SWn. In the normal operation mode, the power supply voltage Vdd in the power supply wiring VDL is supplied to the power supply region by turning on the corresponding power switch. The functional module arranged in the power supply region operates by using the power supply voltage Vdd supplied to the power supply region as the operating voltage. Taking the functional module FNM_1 arranged in the power supply region VD1_1 as an example, the power supply voltage Vdd is supplied to the power supply region VD1_1 via the corresponding power switch SW1, and the functional module FNM_1 operates by the supplied power supply voltage Vdd.

In this way, the power supply voltage Vdd is individually supplied to the power supply regions arranged in the processor 1 and the functional modules arranged in the power supply regions.

In FIG. 1, RETC arranged in each of the power supply regions VD1_1 to VD1_$n$ denote a retention circuit. The retention circuit RETC is a circuit configured to retain the state (data) of the functional module (for example, FNM_1) in the normal operation mode before the transition to the SSTBY mode and returns the retained state to the functional module when returning from the SSTBY mode to the normal operation mode. The retention circuit RETC is connected to the power supply wiring VDL via the power supply wiring VDL_h such that the state can be retained even if the power switch SW1 is turned off in the SSTBY mode, and operates by using the voltage supplied via the power supply wiring VDL_h as the operating voltage. Although not particularly limited, the retention circuit RETC is composed of a flip-flop circuit (FF) configured to capture and retain the state.

Also, in FIG. 1, RSTC denotes a circuit configured to be reset and initialized when returning from the SSTBY mode to the normal operation mode.

In the first embodiment, although not particularly limited, the power supply regions VD2_1 to VD2_$n$ are connected to the power supply wiring VDL without going through the power switches SW1 to SWn, unlike the power supply regions VD1_1 to VD1_$n$. As a result, even in the SSTBY mode, the power supply voltage Vdd is supplied to the power supply regions VD2_1 to VD2_$n$, and the functional modules arranged in the power supply regions VD2_1 to VD2_$n$ can operate by the power supply voltage Vdd. Although not particularly limited, IP (Intellectual Property) modules are arranged as functional modules in the power supply regions VD2_1 to VD2_$n$. Of course, the power supply regions VD2_1 to VD2_$n$ may also be configured such that the power supply voltage Vdd is supplied via the power switch as in the power supply regions VD1_1 to VD1_$n$.

Isolators IS_1 to IS_n are arranged between the power supply regions VD1_1 to VD1_$n$ and the power supply regions VD2_1 to VD2_$n$. For example, the isolators IS_1 to IS_n electrically separate the power supply regions VD1_1 to VD1_$n$ and the power supply regions VD2_1 to VD2_$n$ when transitioning from the normal operation mode to the SSTBY mode. On the other hand, when returning from the SSTBY mode to the normal operation mode, the isolators IS_1 to IS_n electrically connect the power supply regions VD1_1 to VD1_$n$ and the power supply regions VD2_1 to VD2_$n$. This prevents undesired data from being transmitted from the power supply regions VD1_1 to VD1_$n$ to the power supply regions VD2_1 to VD2_$n$ in the SSTBY mode.

The voltage regulator 9 converts the voltage value of a power supply voltage Vcc supplied from a power supply provided outside the processor 1 into the voltage value suitable for the functional modules FNM_1 to FNM_n and others, and supplies it as the power supply voltage Vdd to the power supply voltage VDL.

The processor core 2 executes various processes by executing programs stored in a storage circuit (not shown). When the processor core 2 executes a predetermined program related to the SSTBY mode, the processor core 2 transmits and receives data to and from the FSM controller 3, and issues a standby command for instructing a transition to the SSTBY mode to the FSM controller 3.

When the standby command is issued and when occurrence of a wakeup event is notified, the FSM controller 3 transmits and receives data to and from the clock controller 4, the regulator controller 5, the power controller 6, the retention controller 7, and the reset controller 8, thereby controlling these controllers.

According to the control by the FSM controller the clock controller 4 outputs a clock signal CK, the regulator controller 5 outputs a regulator control signal RC for controlling the voltage regulator 9, and the reset controller 8 outputs a reset signal RST.

The power controller 6 outputs a power switch control signal PSW and an isolation control signal ISC in accordance with the control by the FSM controller 3 and power switch order information PSInf from the setting unit 10. Further, the retention controller 7 outputs a retention control signal RFC in accordance with the control by the FSM controller 3 and retention order information RTInf from the setting unit 10.

The setting unit 10 includes a setting register Reg_PD which is connected to a bus BS and in which the power switch order information PSInf is set by the user via the bus BS and a setting register Reg_RT which is connected to the bus BS and in which the retention order information RTInf is set by the user via the bus BS. The setting unit 10 outputs the information set in the setting registers Reg_PD and Reg_RT as the power switch order information PSInf and the retention order information RTInf.

In the first embodiment, as shown in FIG. 1, the power switch control signal PSW is composed of power switch control signals PSW_1 to PSW_n corresponding to the power supply regions VD1_1 to VD1_$n$, and is supplied to the corresponding power switches SW1 to SWn. Similarly, the retention control signal RFC is also composed of retention control signals RFC_1 to RFC_n corresponding to the power supply regions VD1_1 to VD1_$n$, and is supplied to the retention circuits RETC arranged in the corresponding power supply regions.

On the other hand, the reset signal RST is common to the power supply regions VD1_1 to VD1_$n$, and is commonly supplied to the circuits RSTC arranged in the power supply regions VD1_1 to VD1_$n$. Similarly, the isolation control signal ISC is also common to the isolators IS_1 to IS_n.

<SSTBY Mode>

Figure 2:
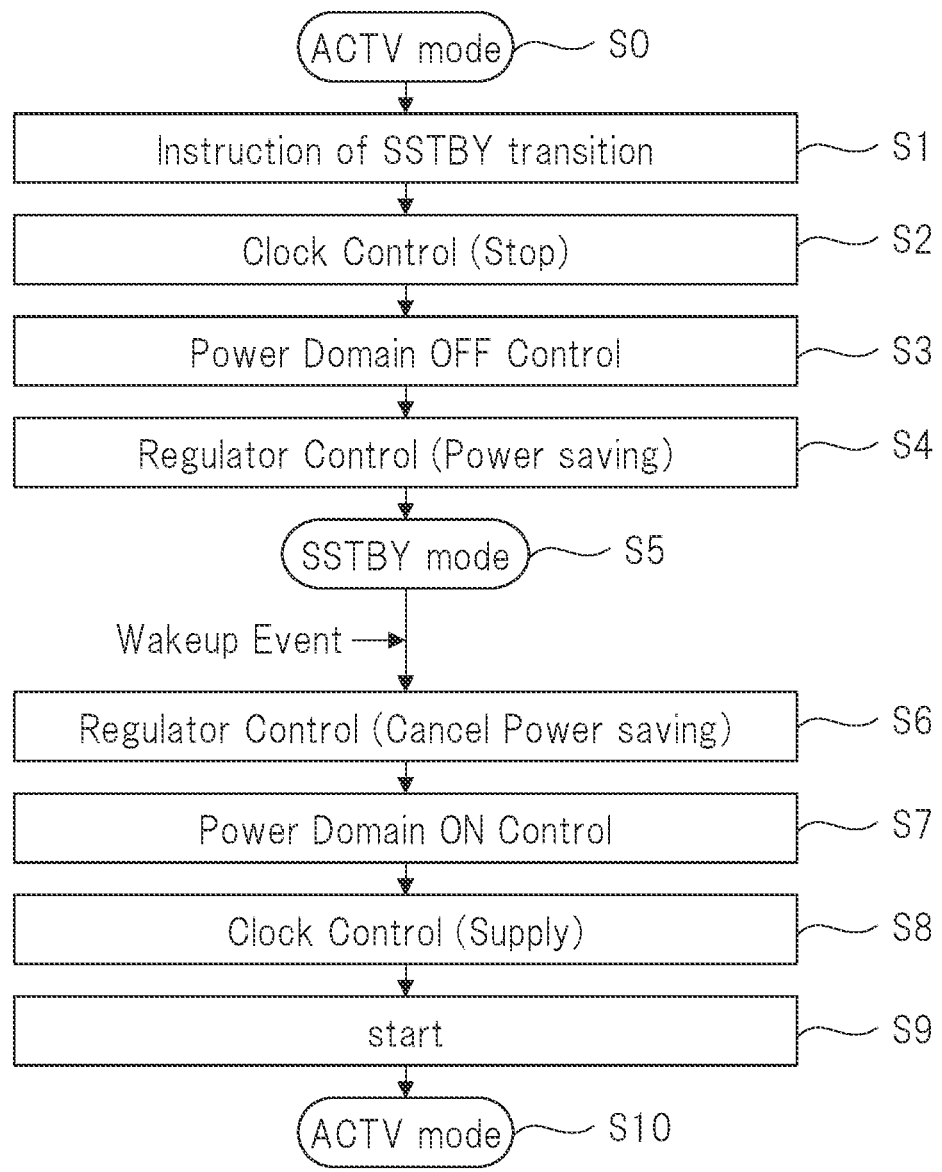
FIG. 2 is a flowchart for describing the SSTBY mode according to the first embodiment.

Next, the transition and return to the SSTBY mode will be described with reference to FIG. 1 and FIG. 2. Here, FIG. 2 is a flowchart for describing the SSTBY mode according to the first embodiment. FIG. 2 shows the case in which the processor 1 operating in the normal operation mode (ACTV mode) transitions to the SSTBY mode, and then returns from the SSTBY mode to the normal operation mode by the notification of the occurrence of a wakeup event.

The processor 1 is operating in the normal operation mode in step S0. In step S1, a standby command for instructing the transition to the SSTBY mode is issued by the processor core 2. In response to the standby command, the FSM controller 3 controls the clock controller 4, the regulator controller 5, the power controller 6, and the retention controller 7 such that the processor 1 transitions from the normal operation mode to the SSTBY mode. Of these controls, the controls of the clock controller 4, the power controller 6, and the regulator controller 5 are shown as steps S2 to S4 in FIG. 2.

In step S2, the FSM controller 3 controls the clock controller 4 so as to stop the output of the clock signal CK in a predetermined state. In step S3, the FSM controller 3 controls the power controller 6 so as to turn off a predetermined power switch by the power switch control signal PSW. For example, in step S3, the power controller 6 turns off all of the power switches SW1 to SWn by the power switch control signals PSW_1 to PSW_n. Also, in step S3, the power controller 6 controls the isolators IS_1 to IS_n so as to electrically separate the power supply regions VD1_1 to VD1_n and the power supply regions VD2_1 to VD2_n by the isolation control signal ISC. Next, in step S4, the FSM controller 3 controls the regulator controller 5 so as to output the regulator control signal RC that reduces the supply capacity of the power supply voltage of the voltage regulator 9.

Further, although not shown in FIG. 2, the retention circuits RETC arranged in the power supply regions VD1_1 to VD1_n are controlled to retain the states of the functional modules FNM_1 to FNM_n at that time in step S2 though not particularly limited. Namely, the retention circuit RETC retains the state before the transition to the SSTBY mode, that is, the states of the functional modules FNM_1 to FNM_n in the normal operation mode.

By executing steps S2 to S4, the clock signal CK is stopped in a predetermined state, and the supply of the power supply voltage Vdd is cut off for the power supply regions VD1_1 to VD1_n. As a result, the operating voltage is not supplied to the functional modules FNM_1 to FNM_n arranged in the power supply regions VD1_1 to VD1_n, and the operation is stopped. At this time, since power is supplied to the retention circuits RETC arranged in the power supply regions VD1_1 to VD1_n by a power supply wiring VLL_h, the retention circuits continue to operate and the states in the normal operation mode are retained.

In this way, the power consumption of the processor 1 is reduced in the SSTBY mode of step S5.

Next, when the occurrence of the wakeup event is notified to the FSM controller 3, the FSM controller 3 controls the clock controller 4, the regulator controller 5, the power controller 6, the retention controller 7, and the rest controller 8 so as to return from the SSTBY mode to the normal operation mode. Of these controls, the controls of the regulator controller 5, the power controller 6, and the clock controller 4 are shown as steps S6 to S8 in FIG. 2.

In step S6, the FSM controller 3 controls the regulator controller 5 so as to output the regulator control signal RC that increases the supply capacity of the power supply voltage Vdd of the voltage regulator 9.

In step S7, the FSM controller 3 controls the power controller 6 so as to output the power switch control signal PSW that sequentially turns on the power switches SW1 to SWn. In response to this control, the power controller 6 outputs the power switch control signal PSW that sequentially turns on the power switches SW1 to SWn in accordance with the power switch order information PSInf set in the setting register Reg_PD. As a result, the power switches SW1 to SWn are sequentially turned on in accordance with the power switch order information PSInf, and the power supply voltage Vdd is sequentially supplied to the corresponding power supply regions VD1_1 to VD1_n. By supplying the power supply voltage Vdd, the functional modules FNM_1 to FNM_n arranged in the power supply regions sequentially become operable.

Next, in step S9, the FSM controller 3 controls the clock controller 4 so as to start outputting the clock signal CK. As a result, the clock signal CK output from the clock controller 4 is supplied to the functional modules FNM_1 to FNM_n arranged in the power supply regions VD1_1 to VD1_n, and the functional modules FNM_1 to FNM_n operate in synchronization with the clock signal CK.

Although not shown in FIG. 2, the reset controller 8 is controlled by the FSM controller 3 so as to output the reset signal RST after the power switches SW1 to SWn are turned on. As a result, the circuits RSTC in the functional modules arranged in the power supply regions VD1_1 to VD1_n are reset and initialized. Further, the retention controller 7 is controlled by the FSM controller 3 so as to sequentially output the retention control signal RFC after the reset controller 8 outputs the reset signal RST. In this case, the retention controller 7 outputs the retention control signals RFC_1 to RFC_n in accordance with the retention order information RTInf from the setting register Reg_RT. When the retention control signal is supplied, the retention circuit RETC arranged in the power supply region outputs the retaining state (data). As a result, the states of the functional modules FNM_1 to FNM_n arranged in the power supply regions VD1_1 to VD1_n sequentially return to the states output from the retention circuit RETC. Namely, the state of the functional module returns to the state in the normal operation mode before the transition to the SSTBY mode.

Further, after step S8, the power controller 6 outputs the isolation control signal ISC that makes the isolators IS_1 to IS_n conductive. As a result, the power supply regions VD1_1 to VD1_n and the power supply regions VD2_1 to VD2_n are electrically connected, and the data generated by the functional modules FNM_1 to FNM_n arranged in the power supply regions VD1_1 to VD1_n can be transmitted to the functional modules arranged in the power supply regions VD2_1 to VD2_n.

Thereafter, the processor 1 starts to operate in step S9, and the processor 1 operates in the normal operation mode in step S10.

<Operation Example 1 in Return>

Figure 3:
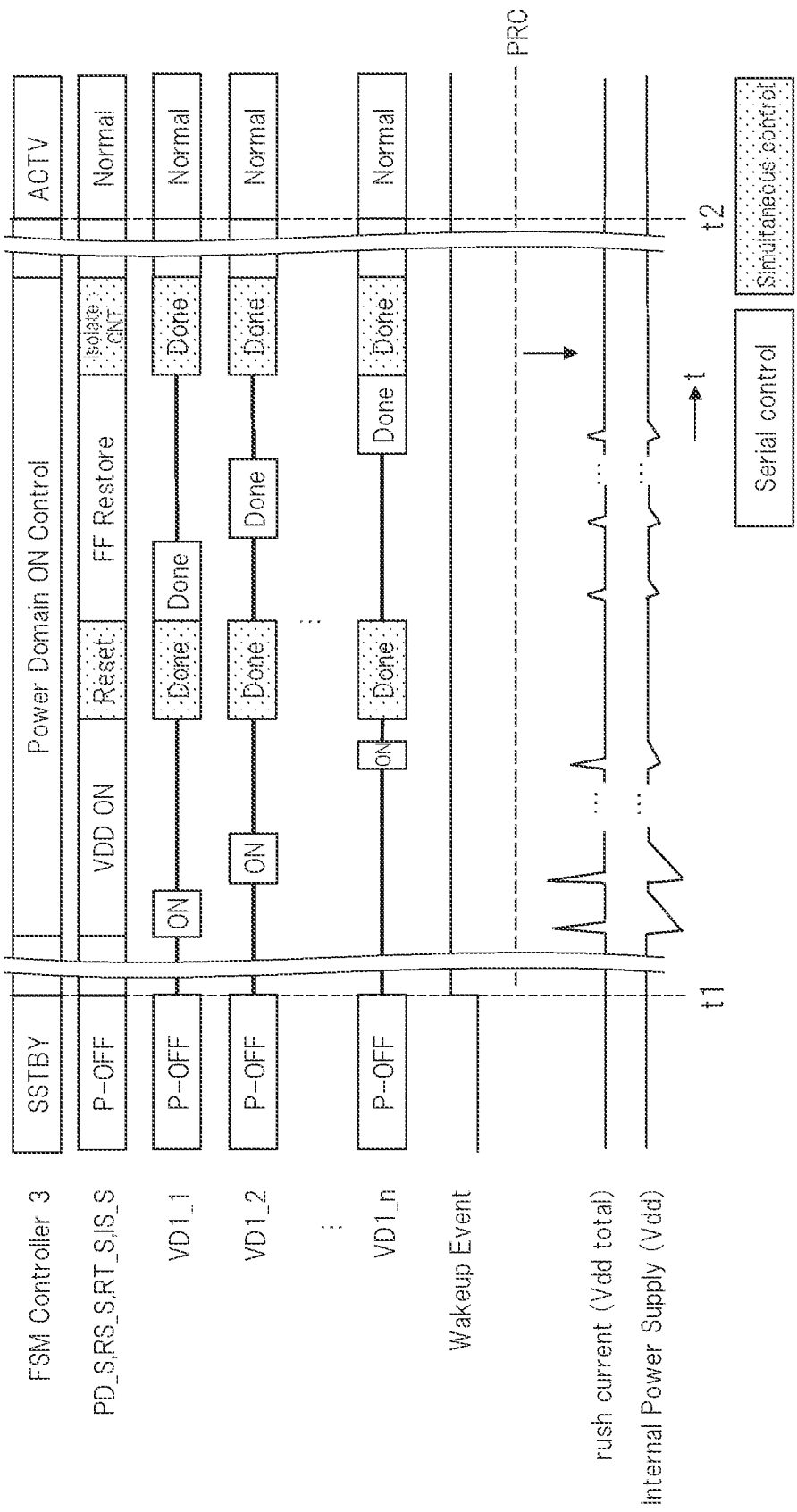
FIG. 3 is a timing chart for describing the operation of the semiconductor device according to the first embodiment.

FIG. 3 is a timing chart for describing the operation of the semiconductor device according to the first embodiment. This figure shows a case where the processor 1 returns from the SSTBY mode to the normal operation mode. In this figure, the horizontal axis represents time t. FIG. 3 shows the case where the order of sequentially supplying the power supply voltage Vdd from the power supply region VD1_1 to the power supply region VD1_n is set as the power switch order information PSInf in the setting register Reg_PD in the setting unit 10 (FIG. 1). Further, FIG. 3 shows the case where the order of sequentially performing the retention (output of retained state) from the retention circuit RETC arranged in the power supply region VD1_1 to the retention circuit RETC arranged in the power supply region VD1_n is set as the retention order information RTInf in the setting register Reg_RT in the setting unit 10.

In FIG. 3, the processor 1 is in the SSTBY mode before the time t1. Here, it is assumed that all the power switches SW1 to SWn corresponding to the power supply regions VD1_1 to VD1_n are in the off state (P-OFF). When the occurrence of the wakeup event is notified to the FSM controller 3 at time t1, the FSM controller 3 starts an operation for returning from the SSTBY mode to the normal operation mode (steps S6 to S9 in FIG. 2). As described with reference to FIG. 2, the FSM controller 3 controls the power controller 6 when the wakeup event is notified. In the case of return, the supply of the power supply voltage Vdd to the power supply region is started, and thus the state of the FSM controller 3 at this time is shown as Power Domain ON Control in FIG. 3.

In the case of return, the power controller 6 controls the state of the power switch SW (PD_S) to be in the on state (VDD ON), and then controls the state of the isolators IS_1 to IS_n (IS_S) to be in the connected state (Isolate: CNT). Further, as shown in FIG. 3, when the power controller 6 is in the return state, the state of the reset controller 8 (RS_S) becomes the state of outputting the reset signal RST (Reset), and the state of the retention controller 7 (RT_S) becomes the state of executing the retention (FF Restore).

When the state of the power controller 6 becomes the on state (VDD ON), the power controller 6 outputs the power switch control signal in accordance with the power switch order information PSInf from the setting register Reg_PD. Namely, in the example shown in FIG. 3, the power controller 6 sequentially turns the power switch control signals PSW_1 to PSW_n to high level. Consequently, the power switches change from the off state to the on state sequentially at the timing indicated by "ON" in the figure. As a result, the power supply voltage Vdd is sequentially supplied to the power supply regions from the power supply region VD1_1 to the power supply region VD1_n. In FIG. 3, "ON" indicates the timing at which the power switches SW1 to SWn change from the off state to the on state, and the on state is maintained after the change to the on state.

As shown in FIG. 3, the supply of the power supply voltage Vdd to the power supply region VD1_n is the last. After the supply of the power supply voltage Vdd to the power supply region VD1_n is completed, the reset controller 8 outputs the common reset signal RST to the power supply regions VD1_1 to VD_n. As a result, initialization is performed in the functional modules FNM_1 to FNM_n arranged in the power supply regions VD1_1 to VD_n substantially at the same time.

When coming into the state of executing the retention (FF Restore), the retention controller 7 controls the retention circuits RETC arranged in the power supply regions so as to execute the retention in the order from power supply region VD1_1 to VD1_n in accordance with the retention order information RTInf from the setting register Reg_RT. Namely, the retention controller 7 outputs the retention control signals RFC_1 to RFC_n in this order. As a result, the retention is executed in the retention circuits RETC arranged in the power supply regions in the order of the power supply regions VD1_1 to VD1_n, and the state before the transition to the SSTBY mode is sequentially restored.

Thereafter, the power controller 6 outputs the common isolation control signal ISC. As a result, the isolators IS_1 to IS_n come into the connected state substantially at the same time, and the power supply regions VD1_1 to VD1_n and the power supply regions VD2_1 to VD2_n are electrically connected. Thereafter, at time t2, the FSM controller 3 returns to the normal operation mode (ACTV) and waits for an instruction from the processor core 2, for example, a standby command. On the other hand, after time t2, the functional modules FNM_1 to FNM_n arranged in the power supply regions VD1_1 to VD1_n are in the normal operation mode (Normal) after the return.

In the example shown in FIG. 3, the power switches SW1 to SWn corresponding to the power supply regions VD1_1 to VD1_n are sequentially changed to the on state. Namely, the timings at which the power switches are turned on can be made different from each other. As a result, when supplying the power supply voltage Vdd to the power supply regions, it is possible to lower the peak value of the rush current (Vdd total) flowing through the power supply wiring VDL. Further, the retention timings are also made different among the power supply regions VD1_1 to VD1_n. As a result, also at the time of retention, it is possible to lower the peak value of the rush current (Vdd total) flowing through the power supply wiring VDL.

In FIG. 3, the broken line PRC indicates the peak value of the rush current when the operation of supplying the power supply voltage Vdd to the power supply regions VD1_1 to VD1_n and the retention operation for the power supply regions VD1_1 to VD1_n are performed at the same time. As can be seen from FIG. 3, according to the first embodiment, it is possible to lower the peak value of the rush current. Since the peak value of the rush current can be lowered, it is possible to suppress the fluctuation of the power supply voltage in the power supply wiring VDL (Internal Power Supply (Vdd)) caused by the rush current, for example, the voltage drop.

According to the first embodiment, the operation of supplying the power supply voltage Vdd to the power supply regions VD1_1 to VD1_n and the retention operation for the power supply regions VD1_1 to VD1_n are executed in order. Namely, these operations are serially controlled (Serial control). On the other hand, the reset operation and the isolation operation for connecting the power supply regions (Isolation: CNT) are controlled so as to be executed substantially at the same time with respect to the power supply regions VD1_1 to VD1_n (Simultaneous control).

The studies by the inventors have revealed that the rush current flowing in the reset operation and the isolation operation for connecting the power supply regions is smaller than that in the operation of supplying the power supply voltage to the power supply region and the retention operation. Therefore, as shown in FIG. 3, the peak value of the rush current can be lowered even if the reset operation and the isolation operation for connecting the power supply regions are executed substantially at the same time. Further, by executing the reset operation and the isolation operation for connection substantially at the same time in the power supply regions VD1_1 to VD1_n, it is possible to shorten the return time from the SSTBY mode to the normal operation mode.

FIG. 3 shows the case where the power switch order information PSInf and the retention order information RTInf are set in the setting registers Reg_PD and Reg_RT in the setting unit 10 such that the power switches are sequentially turned on from the power supply region VD1_1 to the power supply region VD1_n and the retention is sequentially executed from the power supply region VD1_1 to the power supply region VD1_n similarly, but the present invention is not limited to this. Namely, the user can arbitrarily set the order of supplying the power supply voltage to the power supply regions and the order of executing the retention by setting arbitrary orders in the setting registers Reg_PD and Reg_RT.

For example, if the peak value of the rush current that flows when the power supply voltage Vdd is supplied to the power supply regions VD1_1 and VD1_2 is low, the order in which the power supply voltage Vdd is supplied to these two power supply regions substantially at the same time may be set in the setting register Reg_PD. Similarly, the order in which the retention operation is executed for the two power supply regions substantially at the same time may be set in the setting register Reg_RT. In this way, it is possible to further shorten the return time from the SSTBY mode. Of course, the number specified to be executed substantially at the same time is not limited to 2, and may be any number as long as it is less than the maximum number of the power supply regions.

<Operation Example 2 in Return>

Figure 4:
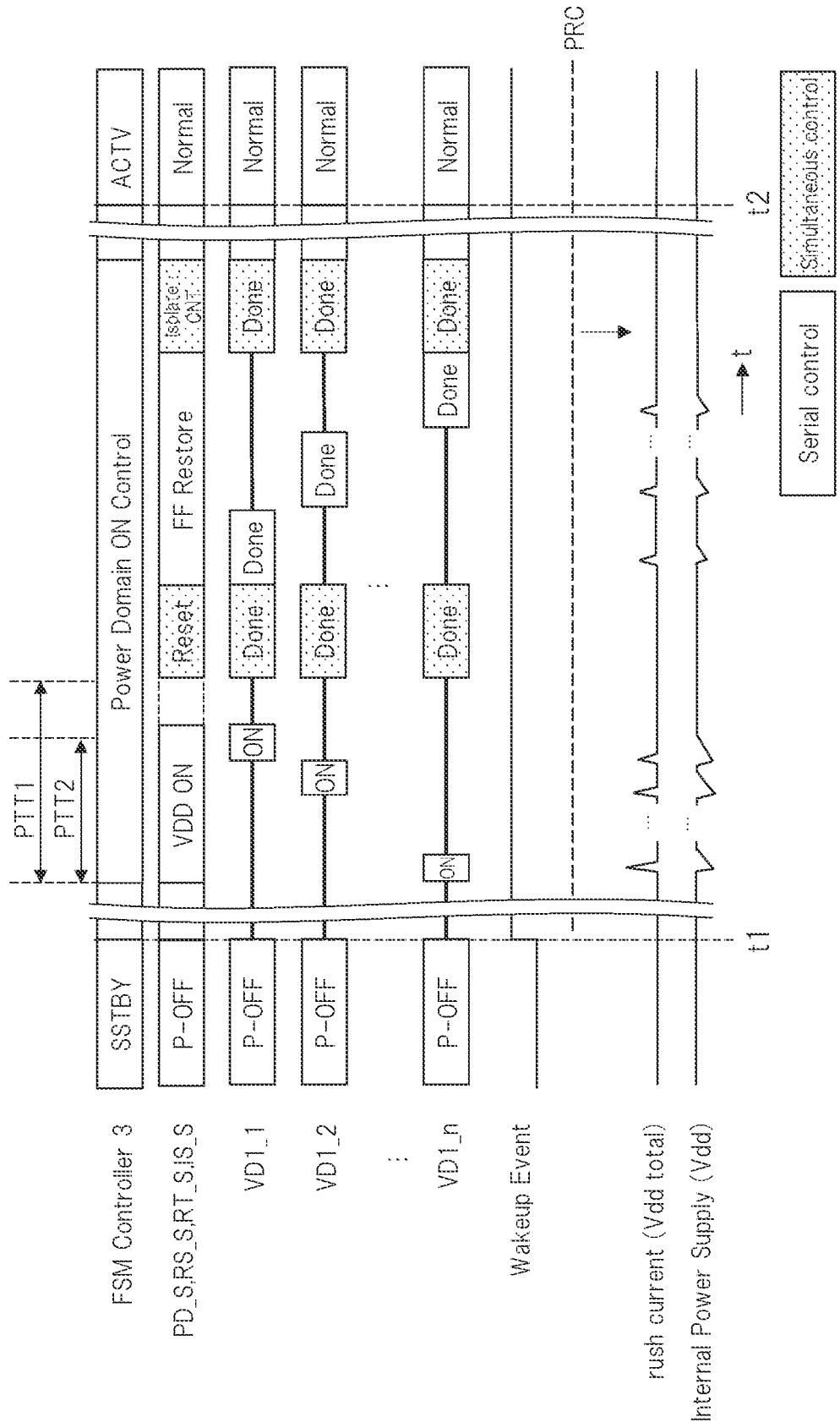
FIG. 4 is a timing chart for describing the operation of the semiconductor device according to the first embodiment.

FIG. 4 is a timing chart for describing the operation of the semiconductor device according to the first embodiment. Since FIG. 4 is similar to FIG. 3, the difference will be mainly described.

The difference is that FIG. 4 shows the timing of setting suitable in the case where the rush current flowing when the power supply voltage Vdd is supplied to the power supply regions VD1_1 to VD1_n increases from the power supply region VD1_n to the power supply region VD1_1.

In FIG. 4, the power switch order information PSInf by which the power supply voltage Vdd is sequentially supplied in order from the power supply region VD1_n having a small rush current to the power supply region VD1_1 having a large rush current is set in the setting register Reg_PD. As a result, the power switches sequentially change from the off state to the on state in order from the power switch SWn to the power switch SW1. In this way, it is possible to shorten the stabilization waiting time in which the power suppl voltage Vdd in the power supply wiring VDL becomes stable after the power switch is changed to an on state. In FIG. 4, a reference character PTT1 denotes a control time in the case where the power switches SW1 to SWn are sequentially turned on in this order as shown in FIG. 3, and PTT2 denotes a control time in the case where the power switches SWn to SW1 are sequentially turned on in this order as shown in FIG. 4. Since it is possible to execute a reset operation or the like after the control time PTT2, it is possible to further shorten the return time.

FIG. 3 and FIG. 4 show an example in which the reset process and the isolation process are performed substantially at the same time for a plurality of power supply regions, but the present invention is not limited to this. For example, only the isolation process may be executed substantially at the same time, or other processes may be executed substantially at the same time for a plurality of power supply regions.

<Modification>

Figure 5:
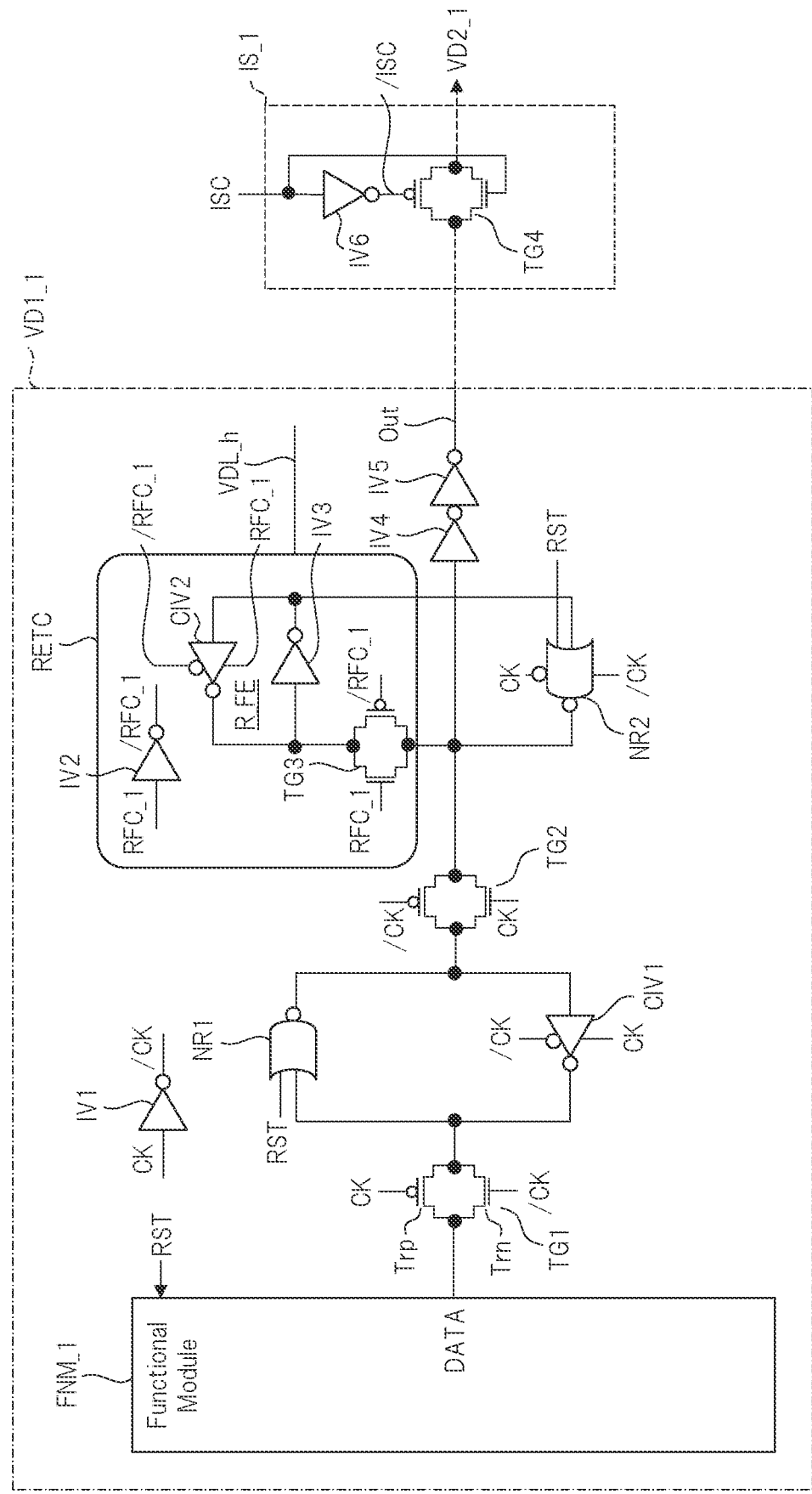
FIG. 5 is a circuit diagram showing a modification of a retention circuit according to the first embodiment.

FIG. 5 is a circuit diagram showing a modification of a retention circuit according to the first embodiment. In this figure, the configuration of the retention circuit RETC arranged in the power supply region VD1_1 and the isolator IS_1 corresponding thereto is shown. The other power supply regions VD1_2 to VD1_n and the isolators IS_2 to IS_n also have the same configuration.

In the power supply region VD1_1, a functional module FNM_1 and a master/slave type flip-flop circuit (hereinafter referred to as MSFF circuit) to which data (DATA) output from the functional module FNM_1 is supplied are arranged. In the MSFF circuit, the master flip-flop circuit (hereinafter referred to as MFF circuit) is composed of a NOR circuit NR1 and a clocked inverter CIV1 whose inputs and outputs are cross-connected. Further, in the MSFF circuit, the slave flip-flop circuit (hereinafter referred to as SFF circuit) is composed of a clocked inverter CIV2, an inverter IV3, a transfer gate TG3, and a clocked NOR circuit NR2. The data of the functional module FNM_1 is supplied to the MFF circuit via a transfer gate TG1, and the output of the MFF circuit is supplied to the SFF circuit via a transfer gate TG2. The output of the SFF circuit or the MFF circuit is supplied from the power supply region VD1_1 to the isolator IS_1 as the output Out of the functional module FNM_1 via inverters IV4 and IV5 connected in series in two stages.

In the SFF circuit, the inputs and outputs of the clocked inverter CIV2 and the inverter IV3 are cross-connected. As a result, a flip-flop circuit R_FF is composed of the clocked inverter CIV2 and the inverter IV3, and the output of the MFF circuit from the transfer gate TG2 is supplied to the flip-flop circuit R_FF via the transfer gate TG3. On the other hand, the output of the flip-flop circuit R_FF is output as the output of the SFF circuit via the clocked Noah circuit NR2.

The transfer gates TG1 to TG3 are each configured by connecting a P channel FET (Trp) having a gate electrode attached with a circle and an N channel FET (Trn) in parallel. The transfer gates TG1 and TG2 are controlled to be switched by the clock signal CK and the phase-inverted clock signal /CK as shown in FIG. 5. On the other hand, the transfer gate TG3 controlled to be switched by the retention control signal RFC_1 and the phase-inverted retention control signal /RFC_1.

Further, whether or not the output of the clocked inverter CIV1 and the clocked NOR circuit NR2 is floated is controlled by the clock signal CK and the inverted clock signal /CK, and whether or not the output of the clocked inverter CIV2 is floated is controlled by the retention control signal RFC_1 and the inverted retention control signal /RFC_1. Further, the NOR circuit NR1 and the clocked NOR circuit NR2 have two inputs, and a reset signal RST is supplied as one input of each. Further, the reset signal RST is also supplied to the functional module FNM_1, and the reset signal RST can reset the circuit RSTC (FIG. 1) in the functional module FNM_1 to the initial state.

In this figure, the inverters that output the inverted clock signal /CK and the inverted retention control signal /RFC_1 based on the clock signal CK and the retention control signal RFC_1 are denoted as IV1 and IV2. Of course, the inverters IV1 and IV2 may be arranged outside the power supply region VD1_1.

The isolator IS_1 includes a transfer gate TG4 and an inverter IV6 connected between the power supply region VD1_1 and the power supply region VD2_1. Like the transfer gate TG1 and the like, the transfer gate TG4 is composed of a P channel FET and an N channel FET, and is controlled to be switched by an isolation control signal ISC and an inverted isolation control signal /ISC formed by the inverter IV6.

In a modification, a part of the SFF circuit functions as the retention circuit RETC. Namely, the retention circuit RETC is composed of the flip-flop R_FF and the transfer gate TG3. As described with reference to FIG. 1, the power supply voltage Vdd is supplied to the retention circuit RETC by the power supply wiring VDL_h.

The retention control signal RFC_1 is at a high level (logical value "1") in the normal operation mode, and is at a low level (logical value "0") in the SSTBY mode so as to continuously retain the data of the functional module FNM_1. Next, the retention operation will be described with reference to the drawings.

Figure 6:
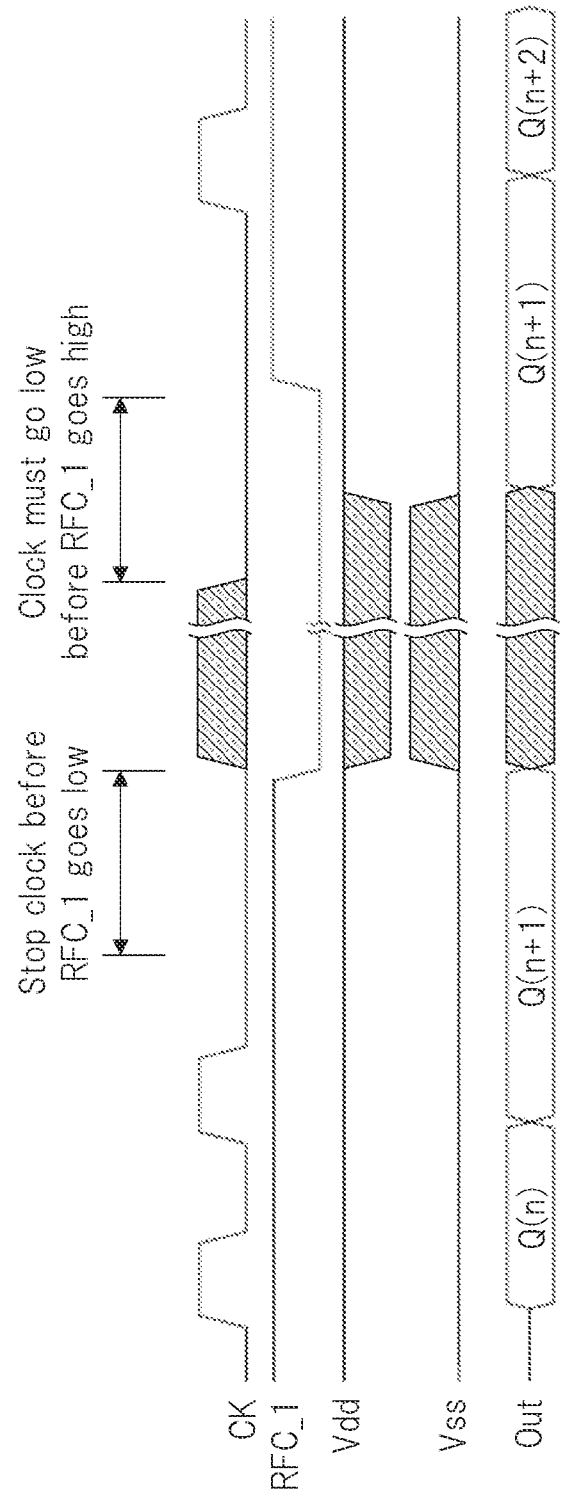
FIG. 6 is a timing chart for describing the operation of the retention circuit according to the modification.

FIG. 6 is a timing chart for describing the operation of the retention circuit according to the modification. In the normal operation mode, since the retention control signal RFC_1 is at a high level, the transfer gate TG3 is in an on state. By the change of the clock signal CK, the data from the functional module FNM is retained in the MFF circuit, and at the next change of the clock signal CK, it is taken and retained in the flip-flop circuit R_FF in the SFF circuit, and further transmitted as the output Out to the power supply region VD2_1 via the isolator IS_1. At this time, since the output of the clocked NOR circuit NR2 is in a floating state, the output of the flip-flop circuit R_FF is not supplied to the inverter IV4. When the clock signal CK changes to a low level, the output of the flip-flop circuit R_FF is output as the output Out. As a result, "Q(n)" is output as the output Out for one cycle period of the clock signal CK.

Next, after changing the clock signal CK to a high level, before changing the retention control signal RFC_1 to a low level in order to transition to the SSTBY mode, the clock signal CK is changed to a low level and the low level is maintained. As a result, the output of the MFF circuit (Q(n+1)) is output as the output Out during the period when the clock signal CK is at a high level, and when the clock signal CK changes to a low level, the output of the flip-flop circuit R_FF (Q(n+1)) is output as the output Out. At this time, by setting the retention control signal RFC_1 to a low level, the transfer gate TG3 is turned off, and the flip-flop circuit R_FF retains the output (Q(n+1)).

By setting the clock signal CK to a low level when returning to the normal operation mode, the output (Q(n+1)) retained in the flip-flop circuit R_FF is output as the output Out via the clocked NOR circuit NR2. Thereafter, by setting the retention control signal RFC_1 to a high level, the transfer gate TG3 is turned on, and new data from the functional module FNM_1 is retained in the flip-flop circuit R_FF.

As a result, when returning from the SSTBY mode to the normal operation mode, it is possible to restore and output the state of the function module FNM_1 in the previous normal operation mode.

In a modification, when returning from the SSTBY mode to the normal operation mode, the order in which the clock signal CK is changed from the low level to the high level is controlled in accordance with the retention order information RTInf. In this way, as described with reference to FIG. 1, the retention operation can be determined in accordance with the retention order information RTInf.

In FIG. 1, the power supply regions VD1_1 to VD1_n can be regarded as the first power supply regions, and the power supply regions VD2_1 to VD2_n can be regarded as the second power supply regions different from the first power supply regions. Further, in FIG. 1, the power controller may be regarded as being composed of the power controller 6 and the power switches SW1 to SWn.

Second Embodiment

Figure 7:
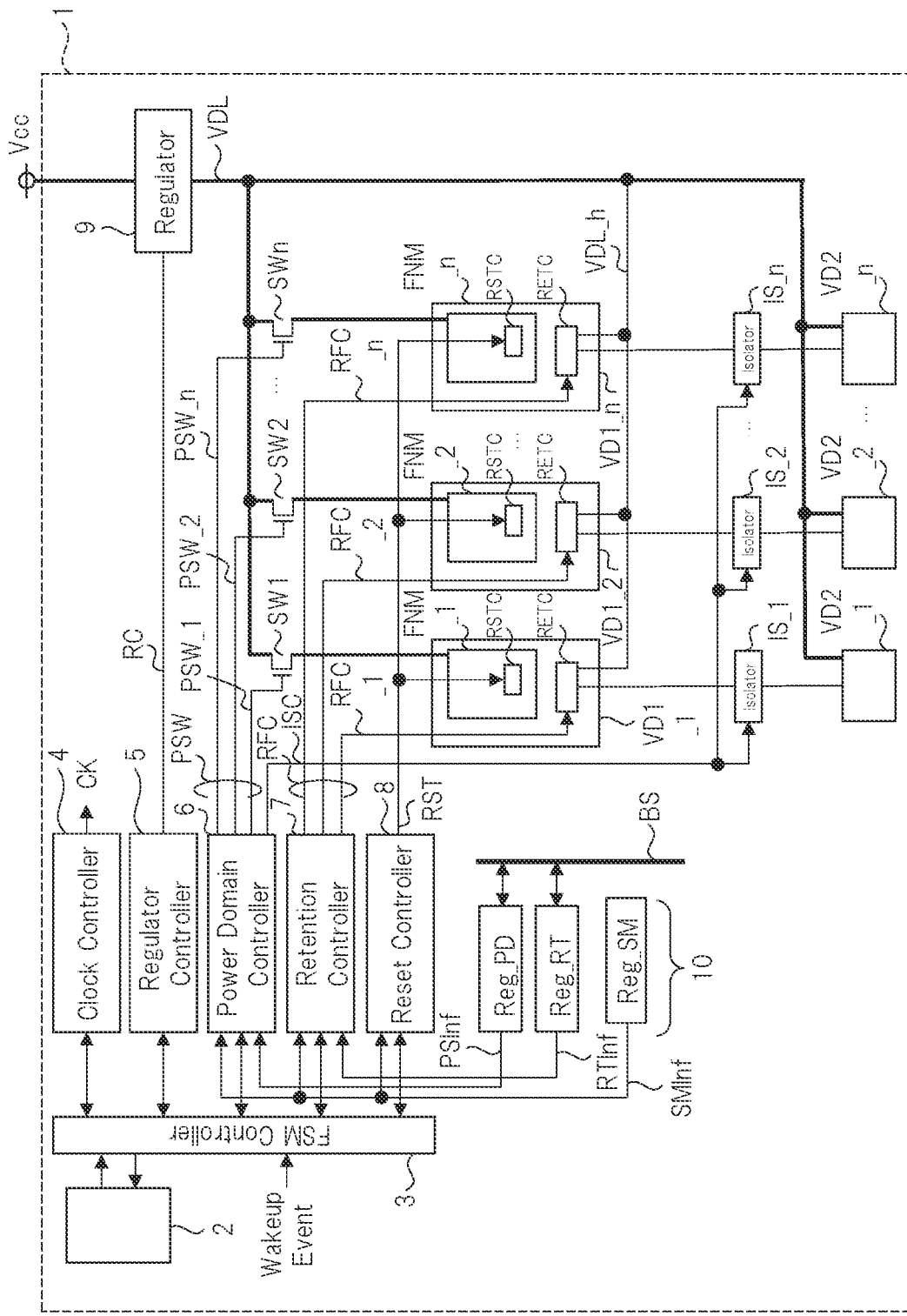
FIG. 7 is a block diagram showing a configuration of a semiconductor device according to the second embodiment.

FIG. 7 is a block diagram showing a configuration of a semiconductor device according to the second embodiment. Since FIG. 7 is similar to FIG. 1, the difference will be mainly described. The difference is that a setting register Reg_SM is added to the setting unit 10 in FIG. 7.

The setting register Reg_SM is a register in which return specifying information SMInf that specifies the process for returning from the SSTBY mode to the normal operation mode for each power supply region is set. For this setting register Reg_SM, the user sets the return specifying information SMInf via the bus BS. In the second embodiment, the return specifying information SMInf is supplied to the power controller 6, the retention controller 7, and the reset controller 8.

The return specifying information SMInf is the information that specifies whether the serial return control (referred to also as serial control) is executed or the return control is executed by combining the serial and simultaneous (parallel) controls (hereinafter referred to as mixed return control or mixed control) described in the first embodiment for each power supply region. A specific example will be described with reference to the drawings.

Figure 8:
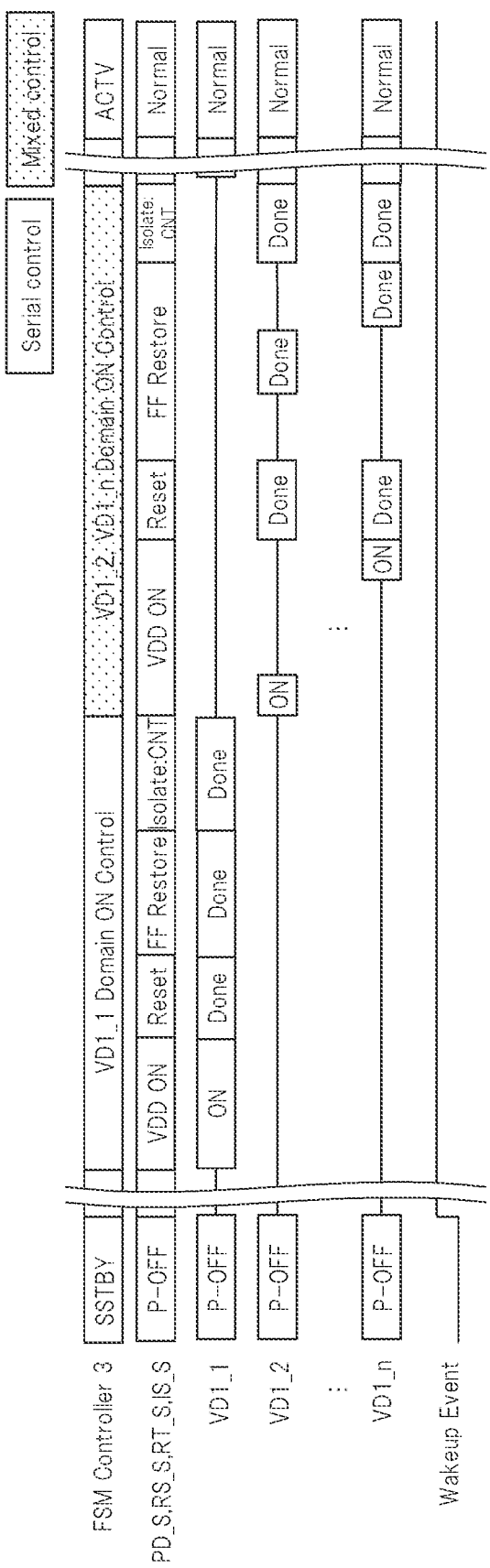
FIG. 8 is a timing chart for describing the operation of the semiconductor device according to the second embodiment.
Figure 9:
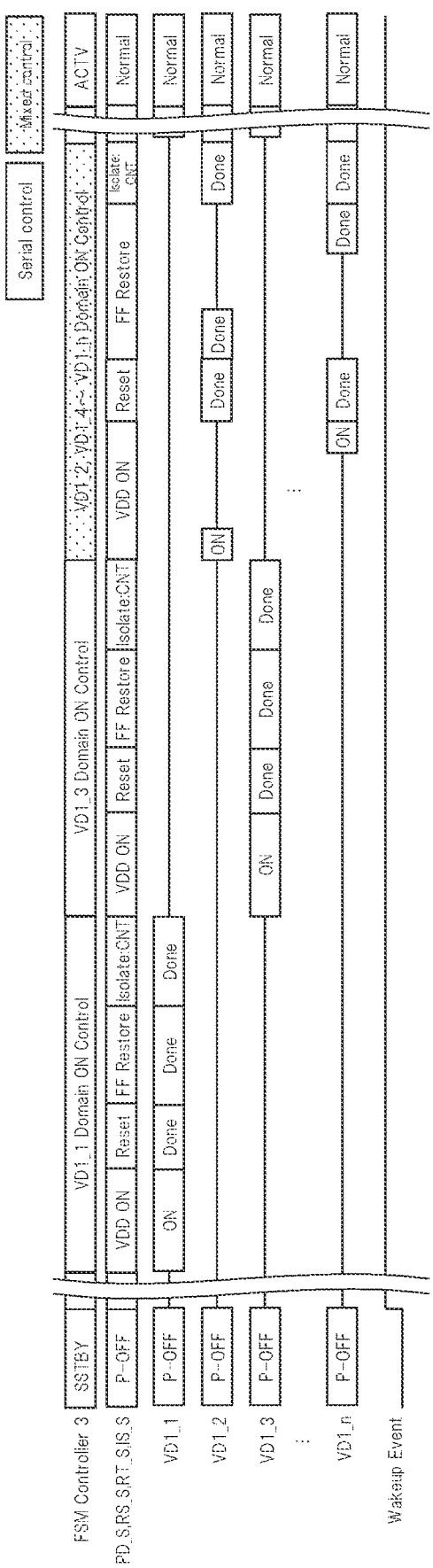
FIG. 9 is a timing chart for describing the operation of the semiconductor device according to the second embodiment.

FIG. 8 and FIG. 9 are timing charts for describing the operation of the semiconductor device according to the second embodiment. Since FIG. 8 and FIG. 9 are similar to FIG. 3, the difference will be mainly described.

FIG. 8 shows the case where the return specifying information that specifies the power supply region VD1_1 as the target for executing the serial return control (Serial control) and specifies the power supply regions VD1_2 to VD1_n as the target for executing the mixed return control (Mixed control) is set in the setting register Reg_SM. Since the mixed return control corresponds to the control described in the first embodiment, the description thereof will be omitted.

The power controller 6 turns on the power switch SW1 corresponding to the power supply region VD1_1 for which the serial return control is specified, and then maintains the off state of the power switches SW2 to SWn corresponding to the power supply regions VD1_2 to VD1_n for which the mixed return control is specified until the reset process and the restore process related to the power supply region VD1_1 and the connection process by the isolator IS_1 are finished. Thereafter, the reset controller 8 and the retention controller 7 execute the reset operation and the retention operation related to the power supply region VD1_1 to which the serial return control is specified. Then, the power controller 6 connects the power supply region VD1_1 to the power supply region VD2_1 by the isolator IS_1.

Thereafter, the power controller 6, the retention controller 7, and the reset controller 8 execute the mixed return control for the power supply regions VD1_2 to VD1_n. Namely, as described in the first embodiment, the power supply voltage Vdd is sequentially supplied to the power supply regions VD1_2 to VD1_n to sequentially executed the retention. Also, the reset operation and the connection operation by the isolator are performed in parallel for the power supply regions VD1_2 to VD1_n.

FIG. 9 shows the case where the return specifying information SMInf that specifies the power supply regions VD1_1 and VD1_3 as the target for executing the serial return control and specifies the power supply regions VD1_2 and VD1_4 to VD1_n as the target for executing the mixed return control is set in the setting register Reg_SM. As a result, the serial return control is executed for the power supply regions VD1_1 and VD1_3, and the mixed return control is executed for the remaining power supply regions.

According to the second embodiment, the user can fix the control order of the power supply regions to be returned in consideration of the rush current value and the processing time. For example, in FIG. 8, it is possible to fix the control order so as to return in order from the power supply region VD1_1 to the power supply region VD1_3.

In FIG. 7, the power supply region for which the serial return control is specified (for example, VD1_1 in FIG. 8)

can be regarded as the third power supply region, and the power supply region for which the mixed return control is specified can be regarded as the first power supply region. In this case, the power supply region VD2_1 corresponding to the power supply region VD1_1 to which the serial return control is specified can be regarded as the fourth power supply region.

In the first embodiment, order information such as the power switch order information and the retention order information is used, but the present invention is not limited to this. For example, the time from when the occurrence of the wakeup event is notified to when the power switch is turned on may be used as the order information regarding the power switch. Similarly, the time from when the occurrence of the wakeup event is notified to when the retention operation is executed may be used as the order information regarding the retention.

In the foregoing, the invention made by the inventors has been specifically described based on the embodiments, but it goes without saying that the present invention is not limited to the embodiments described above and can be variously modified within the range not departing from the gist thereof. For example, the control of the supply capacity of the voltage regulator 9 by the regulator control signal RC has been described in FIG. 1, but the present invention is not limited to this. The voltage regulator 9 may be controlled by the regulator control signal RC such that the power supply voltage Vdd becomes a low voltage in the SSTBY mode. In this case, when transitioning from the SSTBY mode to the normal operation mode, the voltage regulator 9 is controlled by the regulator control signal RC and operates so as to raise the lowered power supply voltage Vdd.

What is claimed is:

1. A semiconductor device comprising:
   a plurality of first power supply regions in each of which a functional module having a predetermined function is arranged and to which a power supply voltage is individually supplied;
   a setting register configured to specify an order of supplying the power supply voltage in the plurality of first power supply regions; and
   a power controller configured to supply the power supply voltage to the plurality of first power supply regions in accordance with the order specified by the setting register,
   wherein, in a standby state in which the power supply voltage is not supplied to the plurality of first power supply regions, the power controller supplies the power supply voltage to the plurality of first power supply regions in response to an occurrence of a wakeup event in accordance with the specified order,
   wherein each of the plurality of first power supply regions includes a retention circuit to which the power supply voltage is supplied in the standby state to retain a state before transitioning to the standby state,
   wherein the setting register is configured to specify an order of operating the retention circuits in the plurality of first power supply regions,
   wherein the semiconductor device further comprising a retention controller configured to operate the retention circuits in response to the occurrence of the wakeup event in accordance with the order specified by the setting register,
   wherein the semiconductor device further comprises a plurality of first isolators connected between the plurality of first power supply regions and a plurality of second power supply regions different from the plurality of first power supply regions, and
   wherein the plurality of first isolators connect the plurality of first power supply regions and the plurality of second power supply regions at the same time in response to the occurrence of the wakeup event.

2. The semiconductor device according to claim 1, wherein the plurality of first power supply regions include circuits which are reset at the same time in response to the occurrence of the wakeup event.

3. The semiconductor device according to claim 1, further comprising a third power supply region including a functional module having a predetermined function,
   wherein, in response to the occurrence of the wakeup event, the power supply voltage is supplied to the third power supply region, a retention circuit arranged in the third power supply region is operated, and the third power supply region and a fourth power supply region are connected by a second isolator connected between the third power supply region and the fourth power supply region.

4. The semiconductor device according to claim 3, wherein, before the power supply voltage is supplied to the plurality of first power supply regions, the power supply voltage is supplied to the third power supply region, the retention circuit provided in the third power supply region is operated, and the third power supply region and the fourth power supply region are connected by the second isolator.

5. The semiconductor device according to claim 3, wherein there are a plurality of the third power supply regions, and the power supply voltage is supplied thereto at timings different from each other.

* * * * *